A. B. HANCE.
COMBINATION TOOL.
APPLICATION FILED OCT. 8, 1920.
1,416,461.
Patented May 16, 1922.
4 SHEETS—SHEET 4.
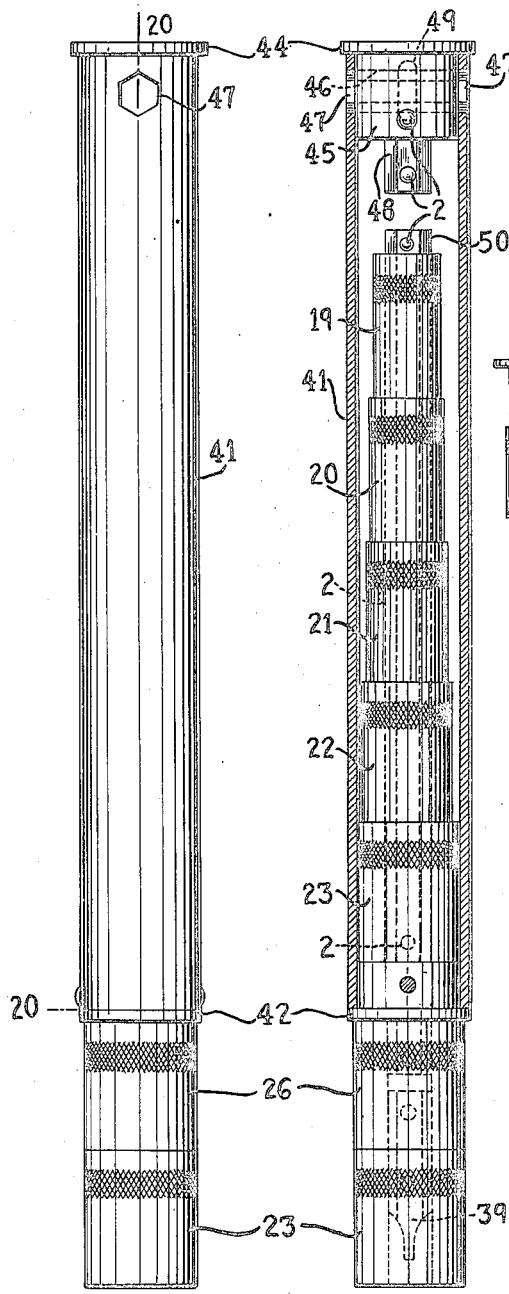
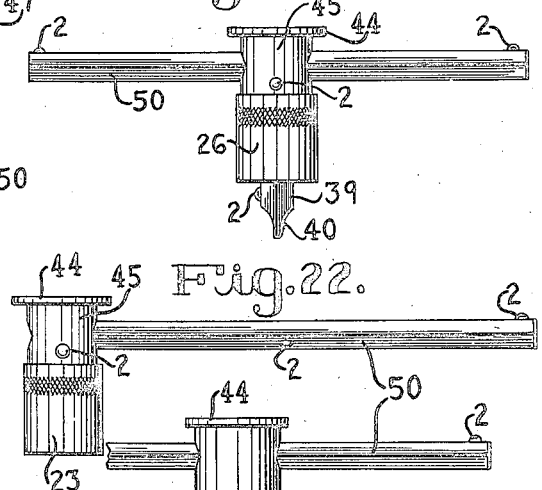
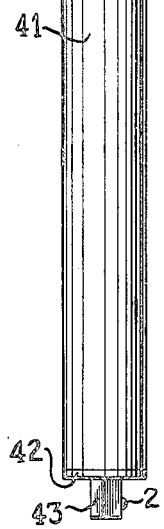
Inventor:
Anselm B. Hance
By his Attorney
Chas. M. Chapman

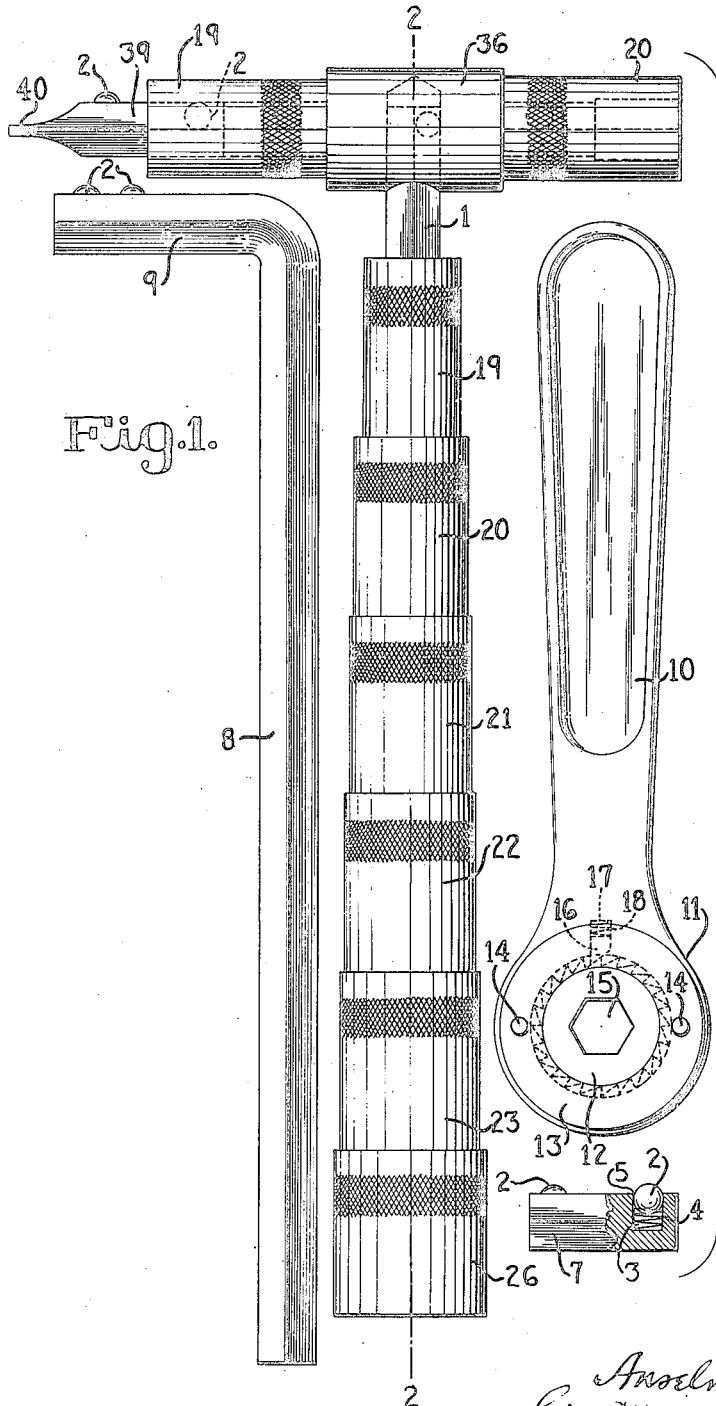
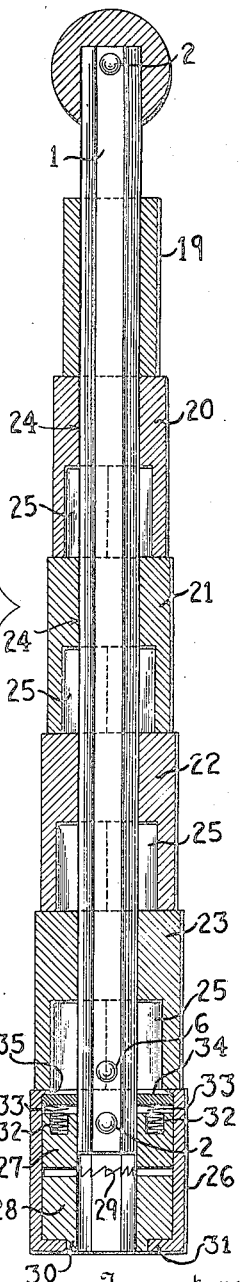

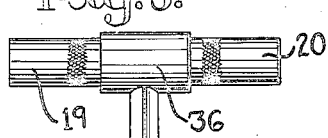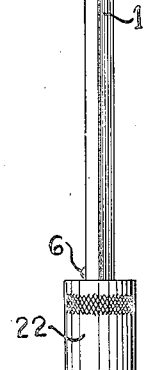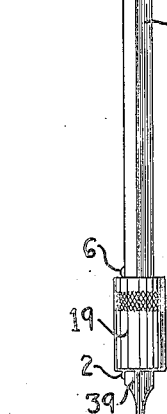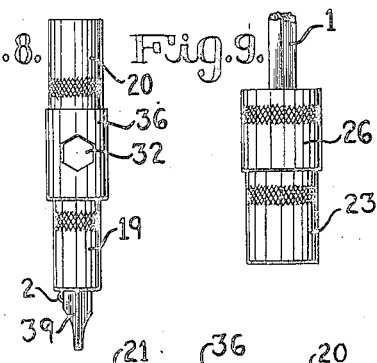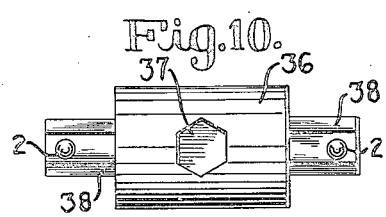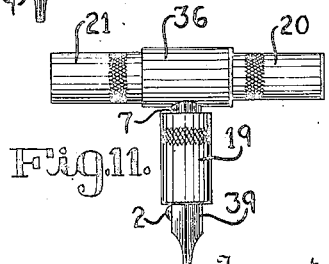

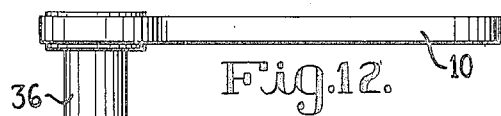
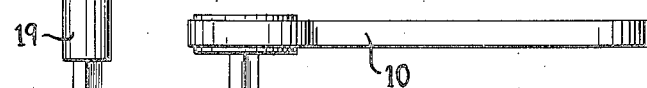
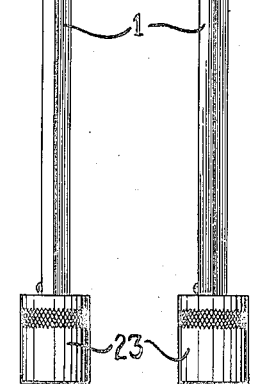
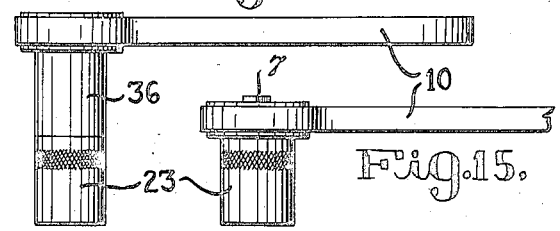
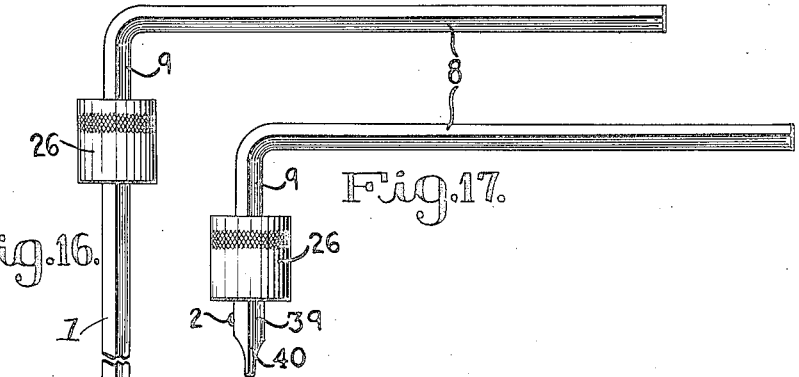
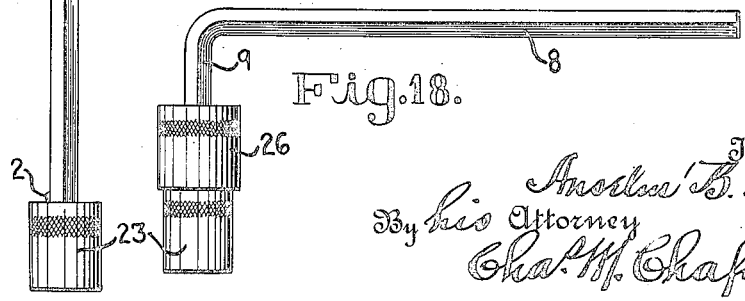

UNITED STATES PATENT OFFICE.

ANSELM B. HANCE, OF NEW YORK, N. Y.

COMBINATION TOOL.

1,416,461.    Specification of Letters Patent.    Patented May 16, 1922.

Application filed October 8, 1920. Serial No. 415,669.

*To all whom it may concern:*

Be it known that I, ANSELM B. HANCE, a citizen of the United States, residing in the borough of Bronx, county of Bronx, and State of New York, have invented a new and useful Improvement in Combination Tools, of which the following is a description.

This invention relates to combination tools and particularly to socket-wrench sets, embodying a plurality of sockets and other serviceable implements, arranged, carried, or stored conveniently for sale, packing, and transportation.

Among the objects of my invention may be noted the following: To provide a combination tool adapted for several uses and in many ways according to the character of the work to be done, or the place or space in which the work is to be done; to provide a socket-wrench set the elements of which are so constructed as to be capable of being strung or arranged upon or within a holder which may be either soild or tubular and by means of which the several elements are conveniently and compactly carried or held for handling, sale, and transportation; to provide a tool by which many of the operations on and about an automobile may be carried out with facility, as in substituting tires, tightening loose bolts, screws, and readjusting parts, etc.; to provide a tool which can be converted into a screw-driver, wrench with long and short handle, ratchet-wrench, crank or straight handle implements, etc.; to provide a plurality of interchangeable devices constituting a "set" which are adapted for many uses and are capable of many combinations; and to provide a simple and compact "set" which is economical to produce, handy to carry about in bag or tool-box, and capable of securing all the objects set forth in the foregoing.

With the foregoing objects in view and others which will be detailed during the course of this description, my invention consists in the parts, features, elements, devices, and combinations thereof hereinafter described and claimed.

In order that my invention may be clearly understood, I have provided drawings wherein:

Figure 1 is a plan view showing a group of implements forming a "bar set" consisting of a handle or bar on which a plurality of devices are supported, a crank-handle or bar, a ratchet-handle, and a connector;

Fig. 2 is a longitudinal section on the line 2—2 of Fig. 1;

Figs. 3, 4 and 5 are plan views showing different combinations of the elements of Fig. 1;

Fig. 6 is a longitudinal sectional view of a simple wrench socket;

Fig. 7 is a similar view of a coupling socket;

Figs. 8 and 9 are plan views showing two more combinations of the elements of Fig. 1;

Fig. 10 is a plan view of the T-head shown in Fig. 1;

Figs. 11 to 18 are plan views of several more different combinations of the elements of Fig. 1;

Fig. 19 is a plan view of another form of my invention showing a group of elements, forming a "tube set" consisting of a tubular holder for a plurality of devices, a handle, and a connector screw-driver;

Fig. 20 is a longitudinal, central section on the line 20—20, Fig. 19; and

Figs. 21 to 23 are plan views of several combinations of the elements of Figs. 19 and 20.

Referring to the drawings, Figs. 1 to 18, the numeral 1 indicates a supporting bar and operating handle in which, near one end, is provided a frictional device, the details of which are shown in Figs. 1 and 2, to consist of a ball 2 held in a socket 3 and normally forced outwardly by a coiled spring 4 and retained in the socket and against the spring by swaging the metal of the bar slightly around the ball, as shown at 5. At the opposite end, the bar 1 is provided with two similar frictional devices spaced apart suitably to enable the inner one 6 to act as a stop for holding the several socket elements on the bar, as shown in Fig. 2, the outer one, indicated by 2, being for the purpose of frictionally holding any of the socket elements in place for a functional operation. Thus the opposite ends of the bar are adapted, by the frictional devices 2, to hold socket and other elements of the set in position for any predetermined operation, the cross-sectional form of the bar 1 aiding in this particular and holding said elements from rotary movement. As shown, the bar 1 is hexagonal in cross-section and this form is adopted because of its efficacy and strength; but I desire it understood that any other cross-sectional form may be adopted, provided it has the attributes of strength, simplicity, and facility of receiving the functional elements of the set.

Fig. 1 shows also a short "connector" or pin 7, having the same cross-sectional form as bar 1, and provided at opposite ends with frictional devices 2, adapted to hold a plurality of socket elements, as presently described.

Fig. 1 also shows a crank-handle or bar 8, also hexagonal in form, having a short crank-end 9 provided with one or more frictional devices 2 near its outer terminal. This handle is very useful and convenient in several operations, as presently shown.

In Fig. 1 is also shown a ratchet-handle or wrench, viz, a handle 10 having an enlarged hollow end 11, provided with a ratchet-socket 12, held between two opposite circular plates 13, one only of which is shown, held together by rivets 14, the socket 12 moving freely between the two plates 13. The ratchet-socket and plates are provided centrally with a hexagonal aperture 15 for the reception of bar 1, handle 8, connector 7, or other similarly constructed elements of the set. As shown, the teeth of ratchet-socket 12 point in one circular direction and said socket is held from turning in clockwise direction by a pawl 16, the point of which is formed similarly to the ratchet-teeth, said pawl operating in socket 17 in the handle 10 and being normally pressed outwardly into engagement with the ratchet-teeth by a spring 18 in said socket 17. Thus the ratchet-socket can be caused to move, for example, with the handle, in a counter-clockwise direction, while, when the handle is moved in clockwise direction, the pawl 16 will slip over the teeth of the ratchet 12, the latter being held by the device to which it is applied.

Other elements, or members, of the set, shown in Figs. 1 and 2, are the several wrench-sockets of different size, the same being sleeved upon the bar 1 for assembly, packing and transportation purposes. The top socket 19 has a hexagonal passage therethrough of uniform size, or diameter, this being a coupling-socket, though it can be used as a wrench-socket, see Fig. 7. The sockets 20, 21, 22 and 23 are similar in structure, differing only in the size of the wrench-socket in one end thereof. Each has a handle or coupling socket 24 and a wrench-socket 25, Fig. 6. A ratchet-socket is also a part of the set, consisting of a hollow, cylindrical member 26 enclosing two hollow ratchet-members 27, 28, the adjacent ends of which have cooperative, oppositely disposed teeth 29, adapted to grip, hold and drive one another in one direction and slip over each other in the other direction of rotation. The member 28 has a shouldered end 30 giving it a journal bearing in the adjacent flanged end 31 of the member 26, enabling said member 28 to freely rotate in the member 26. The member 27 is provided with a plurality of sockets 32 in one end, in which are held coiled springs 33 which normally press outwardly and support a plate 34 prevented from being forced out of the member 26 by inturned flange 35. Thus, the ratchet members 27, 28 are normally held together with their teeth in cooperative engagement and capable of driving each other in one direction, while pressure upon said members in the opposite direction will enable the member 27 to yield longitudinally, under spring resistance, so as to cause the teeth of the respective members to slip over each other. The apertures through the two members 27, 28 and plate 34 are hexagonal and of uniform diameter, thus making the ratchet-socket reversible. This reversibility of the socket is an important feature of my invention and a valuable asset and member in both sets of my invention, since by simply turning the socket end-for-end it can be operated in opposite directions for functional purposes. Each of the socket members has its outer surface knurled in part so as to prevent it from slipping in the fingers.

Another important element of the set of Fig. 1 is the T-head 36, details of which are shown in Fig. 10, comprising the cylindrical body having an angular socket 37 to receive a connector 7, bar 1, or crank-handle 8, each of which has a frictional device 2 adapted to snap into the socket 37. At each end, the body 36 has an angular, central, fixed extension or connector 38, each provided with a frictional device 2 properly located.

Additionally, the set of Fig. 1 includes a screw-driver and connector 39 combined, which can be substituted for the connector 7 when a longer one is desired, or if the latter is in use. The screw-driver-connector has one end reduced to provide an angular member 40 capable of entering the head-slot of a screw or bolt and near the reduced portion, as well as near its opposite end, is provided with a frictional device 2. This screw-driver-connector can be used in several ways, as presently described.

Now, referring to Figs. 1 to 18, inclusive, it will be seen that, with the aggroupment of Fig. 1, the set, consisting of the bar 1 and elements carried thereby, the connector 7, crank-handle 8 and ratchet-wrench 10, can be conveniently incased in a small bag or sheath having the requisite pockets, or it can be snugly packed in a small box or case. As shown in Fig. 1, the elements are combined on bar 1 so that the tool can be used as a ratchet-wrench, since the ratchet-socket 26 is in proper position on bar 1, and the T-head elements carried thereby will constitute a good hand-grip. Or, the T-head elements can be used at the one end 39 as a screw-driver or at the other end as a wrench, since it has a socket, such as 20, secured thereto on an extension 38 of the head. The screw-driver is set in a coupler-socket, as 19, and the latter is slid upon an extension 38 of the head 36, the latter being set upon the bar 1 which is held in the socket 37. Thus a long handle or leverage is provided for either the screw-driver or wrench. The several sockets may be left upon the bar 1, giving a big hand-grip thereto, or they may be removed in case it is found necessary or more convenient. In Fig. 3, a combination is shown wherein the bar 1 is provided with a socket, such as 22, at one end and a handle is provided at the other end by the head 36, a coupler 19 and a small socket 20. Fig. 4 shows a combination wherein the bar 1 carries at one end a coupler-socket 19, in turn having the screw-driver 39 set therein. A handle, at the other end, is formed, as by a couple of the sockets and the T-head 36. Fig. 5 shows a similar combination, the ratchet-socket 26 being substituted for the coupler-socket 19, thus making a ratchet screw-driver. Fig. 8 shows a small straight screw-driver formed of T-head 36, a small socket 20, coupler 19 and screw-driver 39. Fig. 9 shows a ratchet-socket wrench produced by bar 1, having a handle, as in Fig. 5, and having ratchet-socket 26 on its other end, connector 7 being set in the end of said socket, and a simple socket, as 23, on the free end of the connector 7. Fig. 11 is a combination of the head 36, socket 21, socket 20, connector 7, coupler 19, and screw-driver 39. Fig. 12 shows combined the bar 1, simple socket 23, coupler 19, T-head 36, and ratchet-handle 10, thus making a ratchet-socket wrench with long reach. Fig. 13 is a showing of a similar wrench made shorter by omitting the coupler 19 and head 36, the frictional device 2 on the end of bar 1 holding the handle 10 in place. Fig. 14 shows a ratchet-socket wrench formed of the simple socket 23, head 36, and ratchet-handle 10; and Fig. 15 is minus the head 36, connector 7 being used between the handle 10 and socket 23, thus making a long-handled ratchet-wrench. Fig. 16 shows a combination for unusual positions, giving a long handle by use of the crank-handle 8, and a long reach by use of the bar 1, this combination also providing a ratchet-wrench by using the ratchet socket 26 as a coupling between handle 8 and bar 1, and a simple socket 23 at the other end of bar 1. Fig. 18 gives a similar combination with a long handle and short reach by omitting bar 1, and placing ratchet-socket 26 on the crank-end 9 of handle 8, placing connector 7 in the socket 26 and adding a simple socket 23 to said connector. Fig. 17 substitutes the screw-driver 39 for the socket 23, thus making a crank-handle ratchet screw-driver, the connector 7 being omitted.

The foregoing combinations are produced from what I term a "bar set" in contradistinction to the set shown in Figs. 19 to 23, which I term a "tube set."

In Figs. 19 to 23, the set consists of a tube 41, permanently closed at one end by a cap piece 42, riveted or otherwise secured to the tube. The cap piece 42 is provided with an angular extension 43 having a frictional device 2 therein. The opposite end of the tube has a removable closure 44, of slightly greater diameter than said tube, to enable the fingers to get a grip thereon to remove it from the tube. The closure 44 has a body 45 to enter the tube and having a device 2 to hold it frictionally therein. The body has a transverse angular passage 46 in diameter suitable to receive the bar or handle of the set. The passage 46, when the closure is in place, coincides with apertures 47 of like form and diameter in the end of the tube 41. The body 45 has a coupling extension 48 with a frictional device 2, and within the passage 46 has a short groove 49 to receive one of the frictional balls 2 of the handle or bar 50, the latter having a frictional device 2 at opposite ends and in the middle thereof, the two end devices being in the same flat face of the bar, while the middle device is in a different flat face, thus enabling the elements to be slipped thereon without undue retardation. Figs. 20 and 21 show this set to also include a screw-driver element, such as 39, which answers all the purposes of the connector 7 of the "bar set."

Figs. 19 and 20 show how the elements of the "tube set" are carried and combined for packing, transportation and sale. In these figures it will be seen that the elements are slipped upon the bar 50, the inner end of which rests upon the bottom of the tube, and the ratchet-socket 26 and largest socket 23 are secured to the extension 43 by use of the screw-driver-connector 39. As shown in Fig. 20, the closure 44 seals the tube set, since said closure is held in the tube quite firmly by the frictional device 2.

In use, many of the combinations of Figs. 1 to 18 can be produced. In addition, a short ratchet screw-driver with an extension handle can be produced by sliding the bar 50 through the closure-body 45 until the center device 2 of the bar is received in the groove 49, whereupon the ratchet-socket 26 is placed on the extension 48 and the screw-driver is slid into the socket 26. Fig. 22 shows a combination wherein a long handle is provided by bar 50 slid into closure body 45, having a socket such as 23 or 26 set on its extension 48. Fig. 23 shows how the entire tube 41 may be used by passing the bar 50 through the apertures 47 and passage 46 of the closure-body. At the opposite end of the tube any combination desired can be produced by use of the several elements of the set, viz, a simple socket can be applied to extension 43, or the ratchet-socket can be applied, or a simple screw-driver, or a ratchet-screw-driver can be produced, as explained with reference to the "bar set."

I have not attempted to show all the possible combinations of my two sets; but I believe sufficient of them have been displayed to enable anyone skilled in the art to make every possible combination and produce a tool for all possible uses. It will also be clear that, if desired, both the crank-handle 8 and connector 7 could be included in the "tube set."

Having thus described my invention, what I claim as new is:

1. A combination tool comprising a straight supporting member; a plurality of socket elements adapted to be carried thereby; frictional means at opposite ends of said member for retaining the socket elements thereon, including a removable device applied to the supporting member at one end, having means to which other elements may be applied for functional purposes.

2. A combination tool comprising a supporting member; a plurality of socket elements adapted to be carried thereby; said member having at one end means for attachment of a socket element, and for retaining the socket elements on said member; means at its other end adapted to receive a member forming part of a handle; and means applied to the handle member by which the tool may be manipulated.

3. A combination tool comprising a straight supporting member having element retaining means at one end; removable means at the other end for supporting various elements of the tool; and means by which a handle can be produced by combination with the removable means.

4. A combination tool comprising an elongated supporting member; a plurality of socket elements adapted to be supported thereby; means at opposite ends of said member for retaining the socket elements; additional means at one end of the member by which elements of the tool can be interchangeably carried; and means at the other end of the member held by the retaining means for supporting interchangeably other tool elements.

5. A wrench-set comprising a straight bar angular in cross-section; a plurality of socket elements adapted to be carried by said bar; means at the opposite ends of said bar for holding the socket elements interchangeably thereon; and removable means adapted to cooperate with said bar for producing a handle.

6. A wrench-set comprising a straight angular bar having a frictional device at opposite ends; a plurality of interchangeable elements adapted to be held by said frictional devices; and a connector adapted to cooperate interchangeably with a plurality of said elements, whereby a variety of different tools may be produced.

7. A wrench-set comprising an angular bar having a friction device at each end; a socket member having a small socket for cooperation with one end of the bar, and a larger socket for reception of a nut or bolt-head; and a head member, adapted to cooperate with the other end of the bar, having means at its opposite ends for receiving other members of the set.

8. In combination, a supporting bar having a frictional device at each end; a socket supported at one end of the bar and removably held by said device; a member cooperative with the other end of the bar and removably held by said device, said member having opposite extensions provided each with a frictional device for holding other members applied thereto.

9. A combination tool comprising an angular bar provided with a frictional device at each end; a plurality of wrench-sockets of varying sizes adapted to be carried on said bar; a head member having a socket for receiving said bar, said head member having angular end extensions each provided with a frictional device.

10. A head member for a combination tool comprising a cylindrical body having an angular socket extending thereinto at a right-angle to its longitudinal axis, and a plurality of reduced angular extensions one at each end, each extension having a frictional device for holding a tool element.

11. A screw-driver-connector for a combination tool having one end reduced and flattened for cooperation with the head-slot of a screw or bolt and being provided between its ends with one or more frictional devices adapted to hold socket members applied thereto.

12. A combination tool comprising a supporting medium adapted to receive in alinement a plurality of sockets of varying sizes; means at opposite ends of the medium for retaining said sockets thereupon; additional means at one end of the medium for frictionally holding another socket member; and means mounted on the opposite ends of the medium and held by the retaining means adapted to support other members of the tool.

ANSELM B. HANCE.